United States Patent [19]

Cullen et al.

[11] Patent Number: 5,540,202
[45] Date of Patent: Jul. 30, 1996

[54] IGNITION TIMING CONTROL SYSTEM FOR VARYING COLD START SPARK ADVANCE DURING ADAPTIVE LEARNING

[75] Inventors: Michael J. Cullen; Robert M. Marzonie, both of Northville; Alan R. Dona, Huntington Woods; Eric. J. Grant, Royal Oak; Ronald A. Yannone, Clinton; Patrick J. Eggers, Fenton, all of Mich.

[73] Assignee: Ford Motor Company, Dearborn, Mich.

[21] Appl. No.: 539,243

[22] Filed: Oct. 4, 1995

[51] Int. Cl.$^6$ ........................................... F02P 5/14
[52] U.S. Cl. ................................................ 123/424
[58] Field of Search .......................... 123/424, 480, 123/489, 494; 364/431.05, 431.11

[56] References Cited

U.S. PATENT DOCUMENTS

| | | | |
|---|---|---|---|
| 4,364,344 | 12/1982 | Buetemeister | 123/424 |
| 4,574,588 | 3/1986 | Hayama et al. | 60/284 |
| 4,864,998 | 9/1989 | Onishi | 123/489 |
| 5,383,433 | 1/1995 | Fiorenza, II | 123/416 |
| 5,465,697 | 11/1995 | Hamburg et al. | 123/424 |
| 5,482,017 | 1/1996 | Brehob et al. | 123/299 |

FOREIGN PATENT DOCUMENTS

| | | | |
|---|---|---|---|
| 0190632 | 9/1985 | Japan | 123/489 |
| 0190938 | 8/1989 | Japan | 123/489 |
| 0190939 | 8/1989 | Japan | 123/489 |
| 0027140 | 1/1990 | Japan | 123/489 |

*Primary Examiner*—Raymond A. Nelli
*Attorney, Agent, or Firm*—Allan J. Lippa; Roger L. May

[57] ABSTRACT

An electronic ignition timing system which cooperates with an adaptive closed loop fuel control system to provide more rapid heating of an exhaust catalyst by retarding the ignition timing during colds starts only after an index of maturity value has been generated to indicate that fuel control parameters which characterize an individual engine have been adaptively learned and are available to operate the engine with a lean mixture during cold idling conditions. The index of maturity value alters the mode of operation of the fuel control mechanism to provide robust rich operation prior to adaptation and a more aggressive lean mode operation after the adaptive parameters have been developed which permit optimized operation, and alters the ignition timing to retard the spark to more rapidly heat the exhaust catalyst. A mechanism responsive to the estimated temperature of the catalyst restores the spark advance when the catalyst has been heated, and also restores the spark advance when the throttle is depressed.

10 Claims, 3 Drawing Sheets

IGNITION TIMING CONTROL SYSTEM FOR VARYING COLD START SPARK ADVANCE DURING ADAPTIVE LEARNING

FIELD OF THE INVENTION

This invention relates to electronic engine control systems and more particularly to an ignition timing control systems which adapt to different engine operating conditions.

BACKGROUND OF THE INVENTION

In order to more rapidly heat the catalyst in the exhaust system of an internal combustion engine during cold start conditions, the ignition timing may be significantly retarded to provide increased heat flow to the exhaust system. The increased heat flow to the catalyst allows it to function sooner to decrease undesirable emissions. Moreover, by retarding the spark timing during extended idling periods, the consequent sustained reduction in heat flow to the exhaust system is avoided, preventing the catalyst from cooling and becoming less efficient.

Conventional closed loop fuel control systems are responsive to the sensed level of oxygen in the combustion gases produced by the engine as measured by an exhaust gas oxygen level sensor. The controller responds to a lean condition by progressively increasing the fuel delivery rate until a rich condition is detected, then decreases the fuel delivery rate until a lean indication appears, and so on. In this way, the closed loop controller cart maintain the air/fuel mixture at or near stoichiometry to minimize undesirable combustion products.

The fuel control system achieves the desired air/fuel ratio more rapidly when the open-loop portion of the system is able to accurately predict the needed air/fuel ratio based on sensed engine operating conditions (engine speed, load) etc. Adaptive control systems better achieve this accuracy while accommodating production variations in airflow measuring and fuel metering devices used in different engines, by storing parameters developed by the closed loop controller for future use. During subsequent engine operations, the previously generated and stored parameters are retrieved to enable the closed loop controller to more rapidly and more accurately achieve desired air/fuel ratios.

After successful adaptation by the fuel control system, the engines ability to operate at optimal, leaner air/fuel ratios is significantly improved. However, until such adaptation is achieved, the ability of a given engine to provide good driveablility with significantly retarded spark timing is problematic.

SUMMARY OF THE INVENTION

It is an object of the present invention to improve the performance of a vehicle engine by modifying the ignition timing strategy in response to a generated "index of maturity" value.

The index of maturity value indicates the extent to which adaptively-controlled parameters have successfully been produced during normal engine operation. In accordance with the invention, the index of maturity value is employed to authorize a aggressively retarded ignition timing to establish and maintain sufficient catalyst temperatures after the control system has successfully adapted to the engine's particular characteristics while maintaining a less aggressive but more robust ignition timing strategy to help insure acceptable engine performance prior to adaptation.

The present invention operates in conjunction with an electronic engine control (EEC) system in which one or more parameters are evolved, stored in a non-volatile memory, and subsequently used to optimize the operation of the engine. In accordance with the invention, means are employed for monitoring the operation of the adaptive control system to produce an "index of maturity" value which indicates the extent to which such parameters have been successfully generated. Thereafter, the mode of operation of the ignition timing system is selectively altered in response to the index of maturity value to achieve more rapid catalyst light off prior to adaptation and optimized performance after adaptation.

In accordance with a further feature of the invention, in order to minimize the adverse side affects resulting from a more aggressively retarded ignition timing, means are employed for restoring the normal spark advance in response to the estimated catalyst temperature. In this way, the more rapid catalyst heating is achieved by aggressive spark retardation only after the fuel control system has been successfully adapted to tolerate leaner mixtures, and the aggressively retarded timing is terminated after the estimated catalyst temperature indicates that the retarded condition is no longer needed.

In accordance with the invention, the index of maturity value varies from a first value established when the vehicle is first manufactured, or when the storage memory which saves the adaptively produced parameters has been erased or reset, to a second value established when the engine has been operated under predetermined operating conditions to allow the adaptive control mechanism to produced substantially optimized parameters for those conditions.

Means for detecting those engine conditions may be used to set the index of maturity value based on the measured duration of an interval during which adaptation occurs. Alternatively, means may be employed for counting oxygen level switching events which occur during the adaptation period so that the index of maturity is set in accordance with the accumulated count. In the embodiment of the invention to be described, a two-valued index of maturity is initialized to a first value prior to adaptation, or when the adaptive parameter memory is cleared, and switched to a second value indicating that adaptation has occurred whenever a timer measures an adaptation interval longer than a predetermined duration. A backup mechanism is further employed to switch the index of maturity to the second value whenever a count of switching events created by the operating closed loop controller during adaptation exceeds a predetermined count, thus insuring that optimized values will be eventually used even when adaptation interval timer does not reach its threshold value.

As contemplated by the invention, the engine's ignition control system operates in a mode which is selected in part by the index of maturity value. In the preferred embodiment to be described, when the index of maturity value indicates that optimizing parameters are not yet available, the spark timing control system operates in a first mode using normal spark advance to insure robust operation for engines having significantly different characteristics. When, and only when, the index of maturity indicates that the closed loop system has "learned" parameters which insure optimized engine operation, the spark control system is authorized to significantly retard the spark timing in order to create and maintain desired catalyst temperatures. When power demands are placed on the engine, as indicated by throttle position, or when the estimated catalyst temperature reaches a predetermined level the normal spark advance is restored.

BRIEF DESCRIPTION OF THE DRAWINGS

FIG. 4 is a flow chart illustrating the manner in which ignition timing is controlled in part by the index of maturity value.

DESCRIPTION OF THE PREFERRED EMBODIMENT

FIGS. 1–4 illustrate an adaptive ignition timing and fuel control system which employs the principles of the invention to reduce undesirable emissions by retarding the spark to heat the exhaust catalyst while at the same time insuring that engines having significantly different operating characteristics will perform adequately before the fuel control has been adapted to compensate for manufacturing variations between vehicles.

Figure 1:
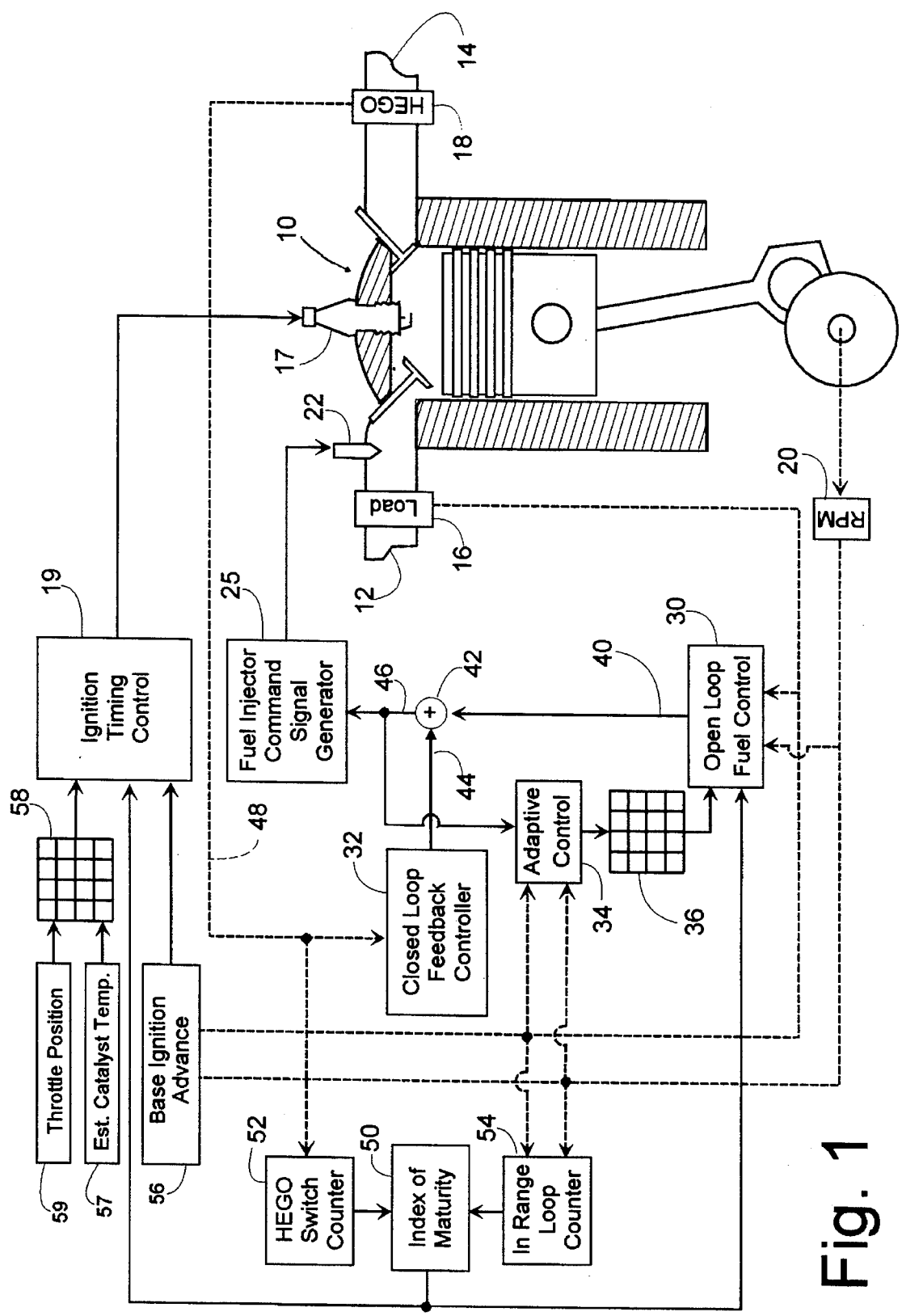
FIG. 1 is a schematic block diagram which illustrates the structure and operation of a preferred embodiment of the invention.

As seen in FIG. 1, an engine indicated generally at 10 has an intake port 12 and an exhaust port 14. Sensing mechanisms which provide a set of input signal values indicating the current operating state of the engine include a load (mass air flow) sensor 16, a heated exhaust gas oxygen (HEGO) level sensor 18, and an engine speed (RPM) sensor 20. The engine 10 is fitted with spark plugs 17 which are fired at times determined by an ignition tinting controller 19.

The engine is further provided with fuel injector(s) as indicated at 22 which operate under the control of a fuel injector command signal generator 25. The fuel injector command signal generator 25 produces injection command signals having a duration which determines the amount of fuel injected into the engine and operates under the control of an open-loop fuel control unit 30, a closed-loop feedback control unit 32, and an adaptive control unit 34 which stores modifiable control parameters in a non-volatile "keep alive memory" (KAM) 36.

In operation, the open loop control unit 30 produces an output signal at 40 which is related to the estimated fuel delivery rate needed to achieve a desired air/fuel ratio under current engine speed and load conditions. The open loop control unit 30 operates in a conventional manner by retrieving parameter values from KAM 36 which correspond to the current engine speed and load conditions as indicated by the input signals from sensors 16 and 20. The mode of operation employed by the open loop control 30 is determined in part by an index of maturity value generated by a unit 50 in the manner described below.

The estimated fuel rate signal 40 produced by the open loop control 30 is then modified at 42 by a signal 44 produced by the closed loop feedback controller 32 to yield a corrected fuel rate control signal at 46 which is supplied to the command signal generator 25.

Controller 32 typically takes the form of a proportional-integral-differential (PID) feedback controller which is responsive to the exhaust oxygen level signal from the HEGO sensor. During normal engine operation, the closed loop controller 32 varies the magnitude of the signal 44 to progressively reduce the amount of fuel delivered to the engine whenever the HEGO sensor 18 indicates a rich condition, and varies the magnitude of the signal 44 in the opposite direction to progressively increase the fuel delivery rate whenever the HEGO sensor indicates a lean condition.

The closed loop controller 32 produces a fuel delivery rate which will achieve stoichiometry. The adaptive control unit 32 stores the value of the corrected fuel rate delivery signal 46 as a control parameter in the KAM 36 at memory locations indexed by the current bad and engine RPM values from sensors 16 and 20. Thereafter, when the engine is again operated under given load and speed conditions, the adaptively stored parameter is read from the KAM memory and supplied to the open loop control unit 30 for use in generating an initial fuel rate value 40 which is then continuously modified at 42 by the closed loop feedback controller 32 in response to the state of HEGO sensor 18 to maintain stoichiometry.

An in-range loop counter 54 is employed to set the index of maturity value. The engine control mechanism seen in FIG. 1 is typically implemented by means of a programmed micro controller which performs the engine control functions schematically illustrated in FIG. 1 by executing programmed routines which are initiated at timed intervals. These adaptive control routines provide acceptable results when performed relatively infrequently as "background loop" processes executed by the EEC micro controller. The in-range loop counting mechanism seen at 54 increments a count value each time a micro controller background loop, when executed, determines that (1) the engine speed and load values are within predetermined ranges of interest and (2) the closed loop controller has achieved operation at or near stoichiometry. When the resulting in-range loop count reaches a predetermined threshold value, it is established that the engine has operated at or near stoichiometry within the defined operating range for a time duration sufficient to insure that learned fuel delivery rate values have been properly stored in the KAM 36 for that range of interest.

As the HEGO sensor 18 switches between lean and rich indications during adaptation, each change of state is counted by a HEGO switch counter 52. In the preferred embodiment of the invention as described below, the in-range loop counter 54 is normally employed to change the index of maturity value from its initial value to a value indicating that learned values are present in the KAM memory. The HEGO switch counter 52 is used as a backup mechanism which insures that the system will switch to a leaner mixture after sustained operation of the closed loop controller, even if the in-range loop counter 54 fails to reach its threshold count.

The ignition timing control 19 energizes the spark plugs 17 at times established by a base ignition advance routine indicated at 56 primarily in response to current engine load and speed as indicated by the sensors 16 and 20. As described in more detail in connection with FIG. 4, the ignition timing control retards the spark timing when authorized to do so by an amount which is functionally related to both the estimated internal temperature of the catalyst and amount by which the throttle is depressed. This functional relationship is stored in a two-dimensional lookup table 58 whose stored values are made available to the ignition timing control.

Figure 2:
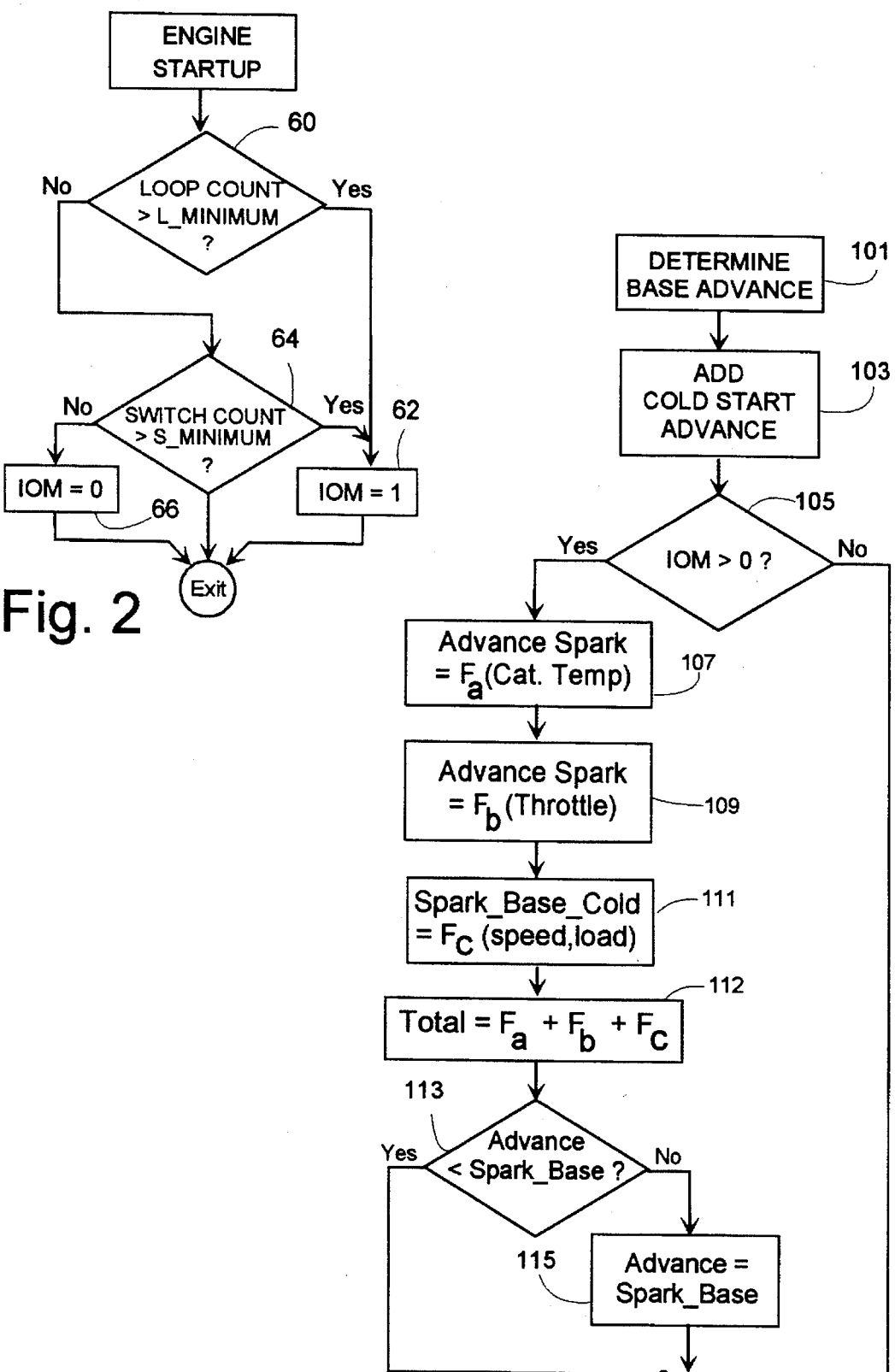
FIG. 2 is a flow chart illustrating the manner in which a two-valued index of maturity parameter is set in response to the current loop count and switch count values produced as shown in FIG. 3.
Figure 3:
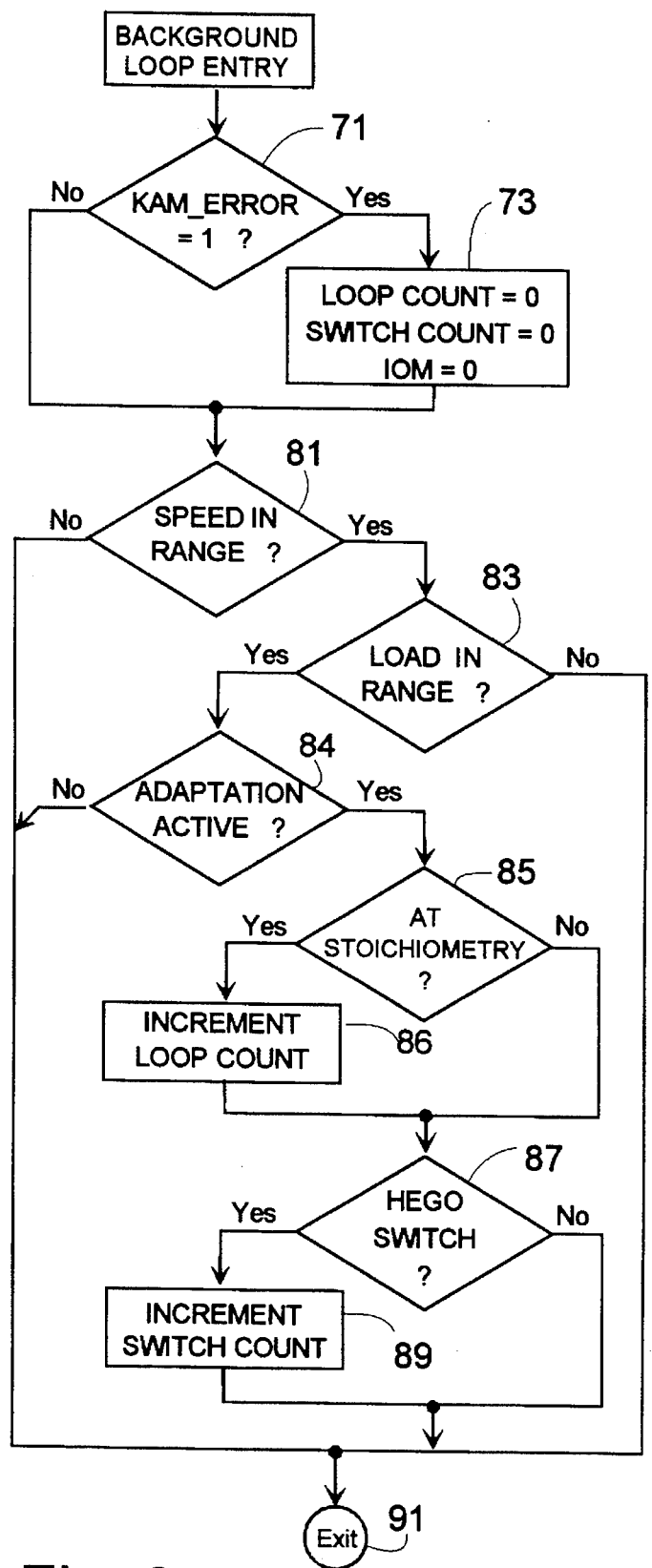
FIG. 3 is a flow chart which describes the manner of generating a loop count value which measures the duration of the time interval during which the engine is operating within a predetermined range of operating conditions; and a switch count value indicating the number of oxygen level changes exhibited by the HEGO sensor during adaptation.

The operation of index of maturity generator 50 is illustrated by the flow chart in FIG. 2. At engine startup (and periodically thereafter), the engine control microprocessor tests the value LOOP COUNT at 60. If LOOP COUNT, which is produced by the in range loop counter seen at 54 in FIG. 1, is greater than a predetermined value L_MINIMUM, the index of maturity value IOM is set to 1. The IOM value is also set to 1 at 62 if the test performed at 64 indicates that the value SWITCH COUNT produced by the HEGO switch counter 52 is greater than the predetermined threshold quantity S_MINIMUM. IF neither LOOP COUNT nor SWITCH COUNT have reached their corresponding threshold counts, the IOM is set to zero at 66. The values LOOP COUNT and SWITCH COUNT are produced as illustrated in FIG. 3. Each time the operative background loop routine is executed by the EEC micro controller, a flag value KAM_ERROR is first tested at 71. The KAM_ERROR flag is set to 1 by the EEC when the vehicle is first assembled, at any time thereafter when KAM memory 36 is cleared by, for example, disconnecting the battery, or when a memory error detection mechanism (not shown) indicates that the stored data may have been corrupted. In response to this indication that the KAM memory does not hold adaptively learned values, the values LOOP COUNT, SWITCH COUNT and the index of maturity IOM are all reset to zero at 73.

Next, a test is performed at 81 to determine whether the engine speed falls within a range established by predetermined minimum and maximum RPM values. If the engine speed is within this established range, a test is performed at 83 to determine whether the current engine mass air flow rate (load) is within a range bounded by predetermined minimum and maximum values.

If the tests at 81 and 83 indicate that the engine is operating within the range of interest (e.g., is operating at "idle"), a test is made at 84 to determine if adaptation is active and, if so, a pair of tests 85 and 87 are performed in sequence.

The test at 85 determines whether or not the engine is operating at or near stoichiometry. This test determines whether the operation of the closed loop feedback controller 32 has successfully mapped values into the KAM 36 which enable the open loop controller 30 to produce a control signal 40 which yields operation near stoichiometric conditions. The successful mapping of parameters into the KAM 36 is indicated by comparing the average magnitude of the correction signal 44 from the feedback controller 32 with a predetermined value. If the open loop controller is operating within an established window about stoichiometry, the loop counter 54, which holds LOOP COUNT, is incremented at 86.

Because the background loop is executed by the EEC micro controller at regular intervals, the value of LOOP COUNT accordingly provides an indication of the length of time during which: (1) the engine has been operating within the speed and load range of interest; (2) when the fuel control system has been running in adaptation mode; and (3) the adaptive control unit 34 has learned and stored parameters in KAM 36 which enable the open loop control 30 to achieve operation at or near stoichiometry.

The test performed at 87 determines whether the HEGO sensor 18 has changed state (from rich to lean or vice versa) since the last test. If a state change has occurred, the value SWITCH COUNT is incremented by one at 89, otherwise the value of SWITCH COUNT remains unchanged. SWITCH COUNT accordingly stores the total number of HEGO state change events which have occurred during adaptation with the engine operating within the speed and load range of interest.

The index of maturity value IOM, which is set as illustrated in FIG. 2, is provided to the open loop control 30 may be used to alter the control strategy when successful adaptation is detected. By way of example, the open loop control unit may advantageously produced an output control signal, OLCS, during cold starting idle conditions using the relation:

$$OLCS = F1(Load, Temp, Tmr) + (IOM * F2(Load, Temp, Tmr))$$

where F1 and F2 are different table lookup functions of engine load, engine temperature, and the value Tmr which indicates the time elapsed since engine startup, with F1 providing a more robust rich fuel mixture and F2 providing additional enleanment in an amount determined by adaptively learned parameters, with the contribution by F2 being effective only when the index of maturity value IOM is non-zero. Although a two valued IOM value is employed in the illustrative preferred embodiment which has been described above, an IOM value which varies continuously between an initial value set before adaption starts and a final value indicating complete adaptation may be employed in connection with relations of the type noted above such that the amount control strategy is made progressively more aggressive as the index of maturity increases.

The mechanism for controlling spark advance is implemented within the EEC micro controller by a background loop routine illustrated by the flow chart seen in FIG. 4.

The base advance timing for the ignition is established at 56 in FIG. 1 and at 101 in FIG. 4 in conventional manner primarily in accordance with the current engine speed and load (mass air flow rate) conditions indicated by the sensors 20 and 16 respectively. The base timing value, specified by the signal value Spark_Base, is used when the exhaust catalyst (not shown) is lit and the engine temperature has stabilized at an elevated level. Immediately after a cold start, an initial spark adjustment is made for a few seconds as indicated at 103 to insure that the engine does not stall. This added cold start advance terminates automatically when a timer (not shown) implemented by the EEC micro controller indicates the expiration of a predetermined cold start interval.

The index of maturity value IOM produced at 50 is supplied to the ignition timing control 19 and authorizes retarding the ignition under appropriate conditions in order to increase the flow of heat to the catalyst. If IOM is greater than zero, as indicated by the test seen at 105 in FIG. 4, the table lookup function illustrated at 58 in FIG. 1 is performed to retard the spark by an amount which is functionally related to the estimated midbed catalyst temperature as illustrated at step 107 in FIG. 4, with the spark advance being restored to supply more power when the throttle is depressed as illustrated at step 109. The functions illustrated at steps 107 and 109 may be implemented using a single, two-dimensional lookup table indexed by throttle depression and estimated midbed temperature as illustrated at 58 in FIG. 1, the values of the lookup table reflecting the sum of value returned by a first function $F_a$ in response to the current catalyst temperature and a second function $F_b$ in response to the current amount of throttle depression. The estimated midbed temperature value may be created as described in U.S. Pat. No. 5,303,168 which issued to M. J. Cullen et al. On Apr. 12, 1994, the disclosure of which is hereby incorporated by reference.

A third function value $F_c$ may be produced by a second two-dimensional lookup table index by speed and load values as indicated at 111 in FIG. 4 which provides a value Spark_Base_Cold based on current speed and load conditions. The three values $F_a$, $F_b$, and $F_c$ are summed at 112 to provide a total spark advance value which is then compared at 113 to the value of Spark_Base, determined at 103 as noted earlier.

If the total spark advance formed at 112 has been retarded by an amount in excess of the clipping level established by Spark_Base, the advance is set to be equal to Spark_Base as indicated at 115. The combination of step 111–115 provides a mechanism for limiting the amount of retard at predetermined speed and load conditions to insure good performance.

It is to be understood that the specific arrangement which has been described is merely illustrative on one application of the principles of the invention. Numerous modifications to the disclosed structures and methods may be made by those skilled in the art without departing from the true spirit and scope of the invention.

What is claimed is:

1. Apparatus for controlling the ignition timing for an internal combustion engine which comprises, in combination, sensing means for producing input signals indicative of the operating state of said engine, an adaptive fuel control system including means responsive to said input signals for generating parameter values during an initial engine operating interval, a memory for storing said parameter values, and means responsive to said parameter values for optimizing the rate at which fuel is supplied to said engine during subsequent engine operations subsequent to said initial operating interval, monitor means coupled to said adaptive fuel control system for generating a predetermined index of maturity value having a first value before said parameter values have been successfully stored in said memory and having a second value after said parameter values have been stored, an ignition controller for supplying timed electrical ignition signals to said engine, said ignition controller including means for establishing a sequence of base ignition signals, and retard control means for producing said ignition signals at times corresponding to said base ignition signals when said index of maturity has said first value had at times delayed with respect to said base ignition signals when said index of maturity value has said second value.

2. Apparatus as set forth in claim 1 wherein said internal combustion engine includes an exhaust system provided with a catalyst heated by the combustion products from said engine and wherein said retard control means further comprises means for producing a control signal having a magnitude related to the internal temperature within said catalyst and means responsive to said control signal for inhibiting the delay of said ignition signals with respect to said base ignition signals.

3. Apparatus as set forth in claim 2 wherein said internal combustion engine is provided with a throttle for controlling the mount of power delivered by said engine and wherein said retard control means further comprises means for inhibiting the delay of said ignition signals with respect to said base ignition signals whenever said throttle is actuated to increase the power demand on said engine.

4. Apparatus as set forth in claim 3 wherein said monitor means includes means for measuring the duration of said initial interval and for setting said index of maturity to said first value whenever said duration exceeds a predetermined duration.

5. An electronic ignition timing system for an internal combustion engine provided with an adaptive control system which includes means for generating engine control parameters during an initial operating period and further includes means responsive to said parameters for thereafter controlling the operation of said engine, said ignition timing system comprising, in combination, means for establishing a sequence of base timing signals, means for supplying ignition pulses to said engine at times corresponding to said base timing signals, means for monitoring the operation of said adaptive control system for producing a predetermined index of maturity signal when said adaptive control system successfully generates said parameters, and spark retarding means responsive to said predetermined index of maturity value for delaying said ignition pulses with respect to said base timing signals.

6. An electronic ignition system as set forth in claim 5 wherein said engine is equipped with a catalyst heated by the exhaust gases from said engine for suppressing undesired engine emissions when heated, and wherein said spark retarding means further includes means for generating an estimate of the internal temperature within said catalyst and means for inhibiting the operation of said spark retarding means by an amount based on said estimate.

7. Apparatus as set forth in claim 5 wherein said internal combustion engine is provided with a throttle for controlling the amount of power delivered by said engine and wherein said ignition timing means further includes means responsive to the actuation of said throttle for inhibiting the operation of said spark retarding means.

8. Apparatus as set forth in claim 5 wherein said means for monitoring the operation of said adaptive control system for producing a predetermined index of maturity signal comprises an exhaust gas oxygen level sensor delivering a two-state output signal indicating the amount of oxygen in the combustion products produced by said engine, and means for counting the number of state changes manifested by said output signal to produce said index of maturity signal.

9. Apparatus as set forth in claim 5 including means for comparing the spark timing established by said spark retarding means with said base timing signals for preventing said spark timing from occurring in advance of said base timing signals.

10. Apparatus as set forth in claim 5 wherein said means for monitoring the operation of said adaptive control system for producing a predetermined index of maturity signal comprises means for measuring the elapsed time during which said engine is operating within a predetermined range of speeds and within a predetermined range of air-flow rates.

* * * * *